United States Patent [19]

Tschritter

[11] Patent Number: 5,078,277

[45] Date of Patent: Jan. 7, 1992

[54] WATER FILLED BICYCLE RACK

[76] Inventor: Harold Tschritter, R.R. #1, Airdrie, Alberta, Canada, T4B 2A3

[21] Appl. No.: 653,908

[22] Filed: Feb. 12, 1991

[51] Int. Cl.⁵ .............................................. A47F 7/00
[52] U.S. Cl. .......................................... 211/20; 211/22
[58] Field of Search .................. 211/20, 22, 17, 23, 211/24

[56] References Cited

U.S. PATENT DOCUMENTS

| 731,651 | 6/1903 | Allen | 211/20 |
| 5,036,986 | 8/1991 | Kral | 211/20 X |

FOREIGN PATENT DOCUMENTS

| 2850763 | 5/1979 | Fed. Rep. of Germany | 211/22 |
| 3317885 | 11/1984 | Fed. Rep. of Germany | 211/22 |
| 888336 | 3/1942 | France | 211/20 |
| 78272 | 1/1955 | Netherlands | 211/20 |
| 212317 | 2/1941 | Switzerland | 211/20 |
| 558041 | 12/1943 | United Kingdom | 211/20 |

OTHER PUBLICATIONS

Mechanix Illustrated, "Hex Rack for Bikes".

Primary Examiner—Carl D. Friedman
Assistant Examiner—Korie H. Chan
Attorney, Agent, or Firm—George Haining Dunsmuir

[57] ABSTRACT

Most bicycle racks are heavy metal objects, which are ill suited for home use. A simple, portable bicycle rack for home use includes a hollow plastic body with an inlet near the top end thereof permitting at least partial filling of the body with water or sand; and an arcuate recess in an inclined front surface of the body for receiving a bicycle wheel to hold the bicycle in a standing position.

2 Claims, 3 Drawing Sheets

WATER FILLED BICYCLE RACK

BACKGROUND OF THE INVENTION

This invention relates to a bicycle rack and in particular to a portable bicycle rack for home use.

In general, bicycle racks are complicated and/or heavy metal objects, which are permanently anchored in one location. Partly because of their structure, and partly because of cost, one seldom sees bicycle racks near most households. In other words, most people do not own a bicycle rack, and, particularly with children, the usual practice is to drop the bicycle on a lawn or driveway. Thus, a need exists for a bicycle rack for home use.

The object of the present invention is to meet the above need by providing a relatively simple, portable bicycle rack, which is easy to manufacture, use and store.

SUMMARY OF THE INVENTION

Accordingly, the present invention relates to a portable bicycle rack comprising hollow casing means; an inlet in said casing means permitting at least partial filling of the casing means with flowable material for stabilizing the rack; and arcuate recess means in the said casing means for receiving a bicycle wheel.

BRIEF DESCRIPTION OF THE DRAWINGS

The invention will be described in greater detail with reference to the accompanying drawings, which illustrate preferred embodiments of the invention, and wherein.

DESCRIPTION OF THE PREFERRED EMBODIMENTS

Figure 1:
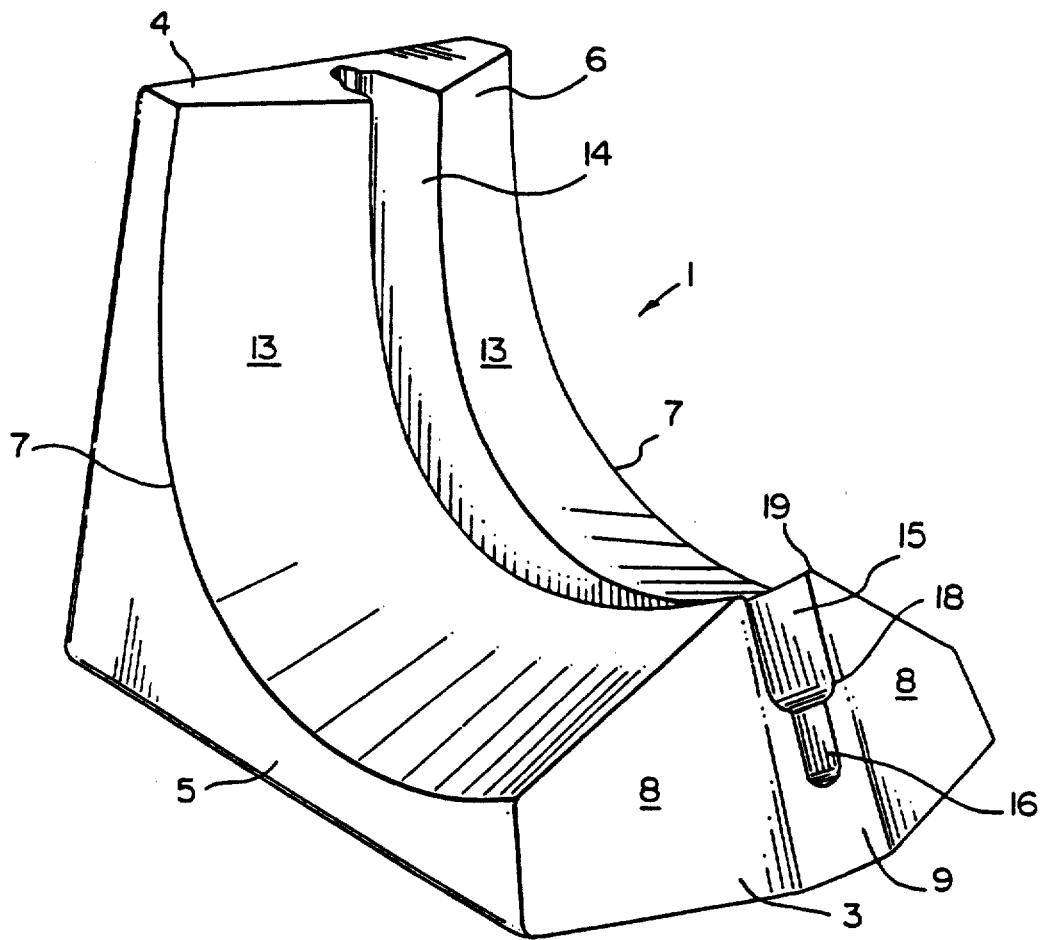
FIG. 1 is a perspective view from above and in front of a preferred embodiment of the bicycle rack of the present invention.
Figure 3:
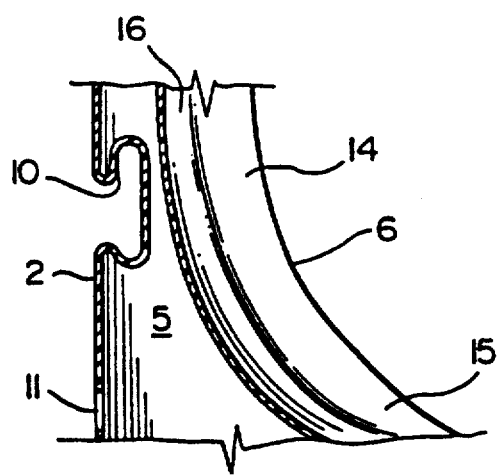
FIG. 3 is a cross section of the top end of the bicycle rack of FIGS. 1 and 2.

With reference to FIGS. 1 and 3, the bicycle rack of the present invention includes a one-piece, generally L-shaped hollow body 1. The body 1 is defined by a planar bottom wall (not shown), which is generally rectangular, a planar upwardly tapering outer or rear wall 2 integral with the bottom wall, an upwardly and rearwardly inclined front end wall 3, a horizontal top end wall 4, a pair of inclined side walls 5, and an arcuate inner or front wall 6 extending between the arcuate top ends 7 of the side walls 5, The side walls 5 are inclined inwardly by the same amount as the side edges of the rear wall 2, so that the body tapers slightly upwardly along the entire length thereof. The front end wall 3 is bowed slightly outwardly, including trapezoidal side panels 8 integral with a thin, rectangular central panel 9.

A deep, elongated, transversely extending depression 10 is provided in the rear wall 2 of the body 1. The depression 10 is generally C-shaped in cross section (FIGS. 3) and is used as a handle for carrying the rack. A circular hole 11 in the rear wall 2 beneath the depression 10 is used to fill the body with water or another flowable substance. The hole 11 is usually closed by a plastic cap (not shown).

The arcuate front wall 6 is defined by upwardly and inwardly inclined side panels 13 bordering a deep central recess 14. The recess 14 extends between the front centre of the top wall 4 and the top centre of the central panel 9 of the bottom end wall 3. The recess 14 includes a large, generally U-shaped outer portion 15 and a smaller, generally U-shaped inner portion 16, which extends inwardly from the bight 18 of the outer portion 15. As shown in FIG. 1, the front end 19 of the body is peaked, so that the recess 14 curves downwardly before curving upwardly to the top end 4 of the body. Thus, once in the recess 14 a bicycle wheel is restrained against rolling out of the rack.

Figure 2:
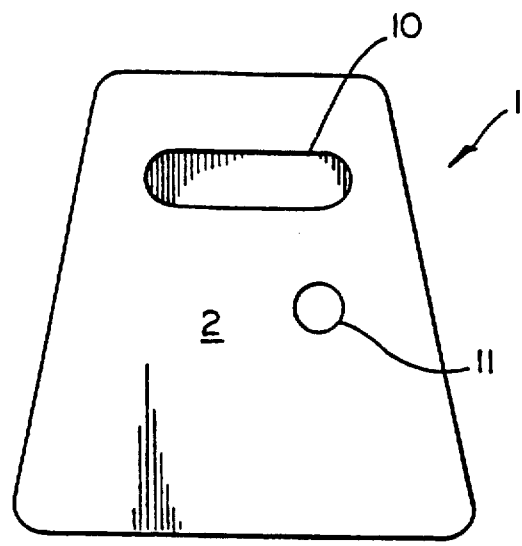
FIG. 2 is a rear elevational view of the bicycle rack of FIG. 1
Figure 4:
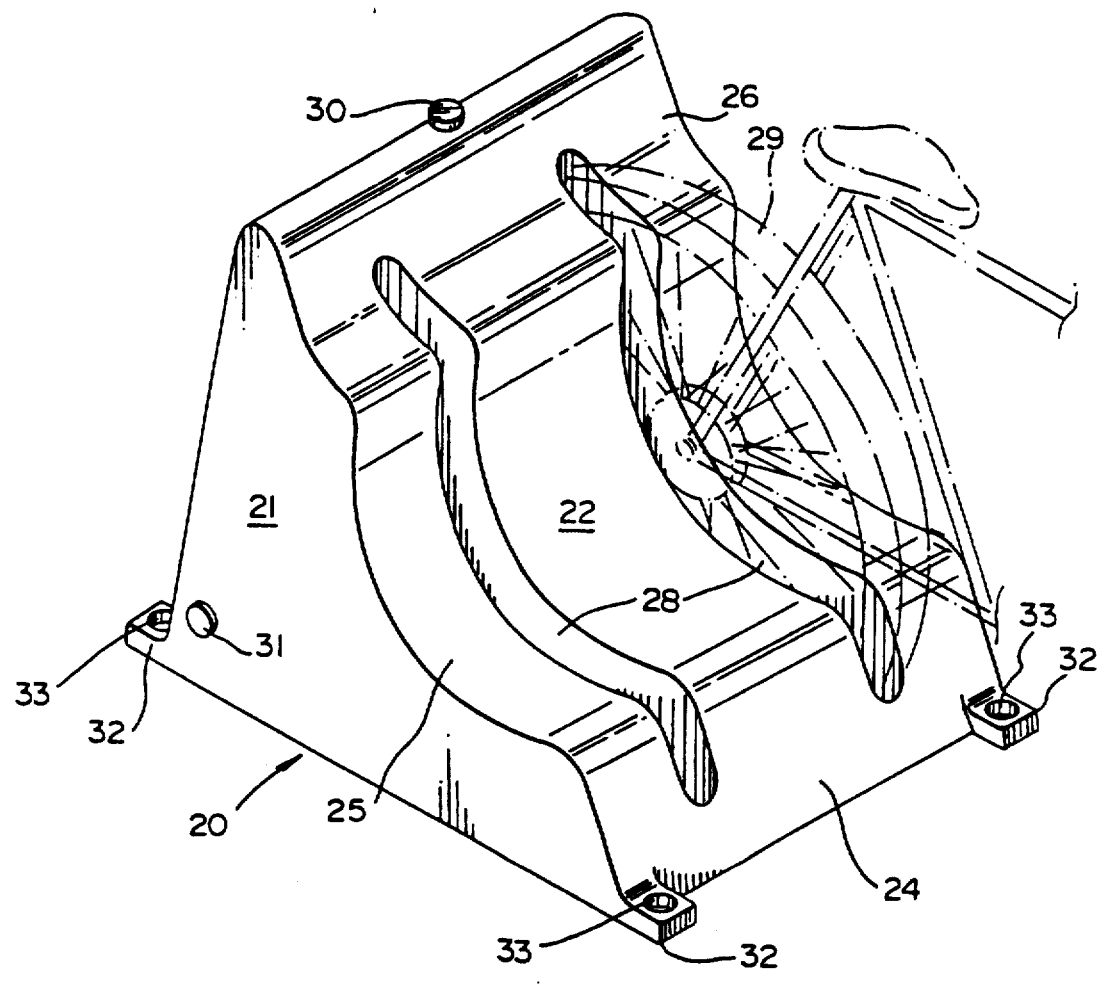
FIG. 4 is a perspective view from above and in front of a second embodiment of the bicycle rack of the present invention.

Referring to FIG. 4, as a second embodiment of the rack designed for two bicycles includes a hollow body generally indicated at 20 which is wider than the body 1 of FIGS. 1 to 3. The body 20, which is generally triangular in cross section, is defined by a rectangular bottom wall (not shown), side walls 21 (one shown) and a front wall 22. The front wall 22 includes a rearwardly inclined lower portion 24, an elongated, shallow, concave, central portion 25, and a shallow, shorter, concave upper portion 26. A pair of elongated, deep concave recesses 28 are provided in the front wall 22 for receiving bicycle wheels 29 (one shown).

A hole (not shown) closed by a cap 30 is provided in the top end of the front wall 22 for filling the body with water or another flowable material. A second hole (not shown) normally closed by a cap 31 is provided in one side wall 21 near the rear bottom end thereof for draining the body. It will be appreciated that draining is required in colder climes where the water used to fill the body may freeze. In Canada and northern United States, the usual practice involves draining the body for storage every autumn and refilling the body in the spring.

A rectangular lug 32 with a hole 33 wherein for receiving a ground anchor (not shown) extends outwardly from each corner of the body 20. Of course, if the body is filled with sand or another heavy material, there will be no need for ground anchors.

Thus, there has been described a relatively simple, readily portable bicycle rack, which is easy to manufacture and store.

What is claimed is:

1. A portable bicycle rack comprising hollow casing means including a hollow horizontal base and a hollow vertical arm integral with the base defining an L-shaped outer surface with a concave inner surface, an inlet in the outer surface of said vertical arm of the casing means above a middle thereof permitting at least partial filling of the casing means with flowable material for stabilizing the rack; and arcuate recess means of U-shaped cross section in the inner surface of the L, said recess means defining a portion of a circle along its length, whereby when a bicycle wheel is inserted in said recess means, a major portion of the outer periphery of said wheel in the recess means contacts the inner surface of the recess means, said recess means including a narrow inner area extending the length of the recess means for snugly receiving said bicycle wheel, and a wider outer area extending the length of the recess means facilitating insertion of said wheel into the rack; said casing means includes a generally rectangular bottom wall; an upwardly tapering outer wall; side walls integral with the bottom and outer walls, said side walls having concave top edges; a concave inner wall integral with the top edges of said side walls, said inner wall containing said recess means, the inner wall on each side of said recess means being inclined outwardly from the recess means to the top edges of the side walls; a horizontal top end wall extending between the outer and inner walls, and between the side walls; and a generally vertical bottom end wall extending between the bottom wall and the inner wall, and between the side walls.

2. A bicycle rack according to claim 1, including an elongated, transversely extending depression of C-shaped cross section in the outer surface of said vertical arm of the casing means, said depression defining a handle for carrying the rack.

* * * * *